United States Patent
Bauman et al.

(10) Patent No.: US 10,569,186 B2
(45) Date of Patent: Feb. 25, 2020

(54) HEXAVALENT CHROMIUM FREE ETCH MANGANESE RECOVERY SYSTEM

(71) Applicant: SRG Global, Inc., Troy, MI (US)

(72) Inventors: Mark Bauman, Troy, MI (US); Daniel Lacey, Troy, MI (US); Gerry Vogelpohl, Troy, MI (US)

(73) Assignee: SRG GLOBAL, INC., Troy, MI (US)

( * ) Notice: Subject to any disclaimer, the term of this patent is extended or adjusted under 35 U.S.C. 154(b) by 0 days.

(21) Appl. No.: 16/030,880

(22) Filed: Jul. 10, 2018

(65) Prior Publication Data

US 2019/0009184 A1 Jan. 10, 2019

Related U.S. Application Data

(60) Provisional application No. 62/530,473, filed on Jul. 10, 2017.

(51) Int. Cl.
*B01D 1/14* (2006.01)
*C09K 13/00* (2006.01)
*B01D 3/10* (2006.01)
*C25D 13/16* (2006.01)
*C09K 13/04* (2006.01)
*C25D 13/24* (2006.01)
*C23C 18/24* (2006.01)
*C23C 18/18* (2006.01)
*C23C 18/31* (2006.01)

(52) U.S. Cl.
CPC .............. *B01D 1/14* (2013.01); *B01D 3/10* (2013.01); *C09K 13/00* (2013.01); *C09K 13/04* (2013.01); *C23C 18/1893* (2013.01); *C23C 18/24* (2013.01); *C25D 13/16* (2013.01); *C25D 13/24* (2013.01); *C23C 18/31* (2013.01)

(58) Field of Classification Search
CPC ........ C25D 13/24; C25D 21/16; C23C 18/24; C23C 18/1893; C09K 13/04
USPC .................... 216/96, 99, 108; 252/79.1, 79.2
See application file for complete search history.

(56) References Cited

U.S. PATENT DOCUMENTS

| | | | |
|---|---|---|---|
| 4,310,382 A | 1/1982 | Gress | |
| 4,952,290 A | 8/1990 | Carnarius et al. | |
| 2002/0028505 A1* | 3/2002 | Sakai | C10G 27/00 435/299.1 |
| 2004/0129677 A1 | 7/2004 | Portner et al. | |
| 2011/0311433 A1* | 12/2011 | Lykke | B01D 1/14 423/522 |
| 2013/0186862 A1* | 7/2013 | Pearson | C25C 1/10 216/83 |
| 2015/0064346 A1 | 3/2015 | Middeke et al. | |
| 2017/0088971 A1* | 3/2017 | Herdman | C25D 5/56 |
| 2017/0130354 A1* | 5/2017 | Nishigawa | C25D 3/38 |

OTHER PUBLICATIONS

International Search Report and Written Opinion for International Application No. PCT/IB2018/055067, dated Oct. 22, 2018, 12 pages.

* cited by examiner

*Primary Examiner* — Binh X Tran

(57) ABSTRACT

Methods for recovering manganese etchant solutions are provided wherein a process solution used to rinse or neutralize a nonconductive substrate after etching the substrate is collected and evaporated to provide a concentrated process solution that is fed back into the manganese etchant solution or acid rinse.

24 Claims, 9 Drawing Sheets

| | Liquid Feed | Vent | Concentrate |
|---|---|---|---|
| VapFrac | 0.000 | 1.000 | 0.000 |
| T [F] | 166.429 | 166.429 | 166.429 |
| P [psia] | 14.696 | 0.896 | 0.896 |
| Mass Flow [lb/h] | 4310.100 | 2082.260 | 2227.840 |
| Mass Fraction [Fraction] | | | |
| Acid Matrix | 0.500 | 0.000 | 0.967 |
| WATER | 0.500 | 1.000 | 0.033 |
| MassFlows [lb/h] | | | |
| Acid Matrix | 2155.040 | 0.000 | 2155.040 |
| WATER | 2155.050 | 2082.260 | 72.790 |

|  | Liquid Feed (S1) | Air (S2) | Vent (S4) | Concentrate (S5) |
|---|---|---|---|---|
| Vapor Fraction | 0.00 | 1.00 | 1.00 | 0.00 |
| T (F) | 175.71 | 50.00 | 175.71 | 175.71 |
| Mass Flow (lb/hr) | 2617.200 | 15714.290 | 18062.090 | 269.411 |
| Mass Fraction (fraction) |  |  |  |  |
| Sulfuric Acid | 0.090 | 0.000 | 0.000 | 0.874 |
| Water | 0.900 | 0.000 | 0.130 | 0.029 |
| Oxidizer | 0.010 | 0.000 | 0.000 | 0.097 |
| Air | 0.000 | 1.000 | 0.870 | 0.000 |
| Mass Flow (lb/hr) |  |  |  |  |
| Sulfuric Acid | 235.550 | 0.000 | 0.000 | 235.550 |
| Water | 2355.500 | 0.000 | 2347.809 | 7.691 |
| Oxidizer | 26.170 | 0.000 | 0.000 | 26.170 |
| Air | 0.000 | 15714.290 | 15714.290 | 0.000 |

HEXAVALENT CHROMIUM FREE ETCH MANGANESE RECOVERY SYSTEM

CROSS REFERENCE TO RELATED CASES

The present application claims priority from U.S. Provisional Application No. 62/530,473 filed on Jul. 10, 2017, which is hereby incorporated by reference in its entirety.

FIELD

The present disclosure relates to a hexavalent chromium free etch manganese recovery system.

BACKGROUND

This section provides background information related to the present disclosure which is not necessarily prior art.

Many conventional processes to metallize a nonconductive substrate include etching the substrate, followed by activation, followed by electroless metallization. Electroless metallization renders the nonconductive substrate conductive, thereby allowing for subsequent traditional electroplating processes. In many such processes, the etching of the substrate is accomplished by dipping the nonconductive substrate in a chromic acid-sulfuric acid mixture.

Many such etching processes predominantly utilized hexavalent chromium. In the past several years, however, the use of hexavalent chromium etchants has declined because of the healthcare risks hexavalent chromium poses. Yet other methods have avoided using chromium in the etchant solution altogether and migrated to other solutions, including Manganese based etchant solutions. Mn etchant solutions have other unique challenges. There is a continual need to further reduce the costs associated with the Mn etchant solution.

SUMMARY

This section provides a general summary of the disclosure, and is not a comprehensive disclosure of its full scope or all of its features.

The present technology provides a method for recovering manganese for use in a manganese etchant process. The method includes neutralizing with a neutralizer solution a nonconductive substrate after etching the substrate with an etchant solution. The neutralizer solution comprises a solution comprised of an acid and an oxidizer. At least a portion of the used neutralizer solution or manganese containing rinse, herein referred to as process solution, is removed and sent to an evaporating processing tank, where the process solution is evaporated to remove any oxidizer and concentrate from the remaining used process solution. The concentrated process solution is added to an etchant or acid rinse solution. In other embodiments, the concentrated process solution is concentrated to greater than or equal to about 2 g/L Mn. In yet other embodiments, the evaporator assembly comprises an atmospheric evaporator or vacuum evaporator. In other embodiments, the evaporator assembly comprises an evaporating processing tank. In yet other embodiments, the evaporating processing tank is warmed and treated with a vigorous air treatment. In various embodiments, the etchant solution comprises a source of manganese ions.

The present technology also provides a method for recovering a manganese etchant solution for use in a manganese etch. The method includes neutralizing with a neutralizer solution a nonconductive substrate after etching the substrate with an etchant solution. The neutralizer solution comprises at least one of an acid and an oxidizer. At least a portion of the process solution is concentrated to a concentration of the etchant solution. The concentrated process solution is fed into the etchant process. In other embodiments, the concentrated process solution is concentrated to greater than or equal to about 2 g/L Mn. In yet other embodiments, the neutralizer solution comprises an acid and an oxidizer. In even further embodiments, at least a portion of the process solution is transferred into an evaporator processing tank for concentrating the process solution. The evaporator assembly may further comprise an atmospheric evaporator or vacuum evaporator. In other embodiments, the evaporator assembly may further comprise an evaporating processing tank. In other such embodiments, the evaporating processing tank may be warmed and treated with a vigorous air treatment. In other embodiments, the etchant solution comprises a source of manganese ions.

The present technology further provides an evaporating system for recovering manganese etchant solution. The evaporating system comprises an evaporator assembly, and the evaporator assembly is configured to evaporate water from a process solution to form a concentrated process solution. The evaporator assembly is transferrably connected to a process tank configured for use in an electroless metallization process. The process tank contains a process solution that is configured to be transferred into the evaporating tank. In other embodiments, the evaporator assembly further comprises an evaporating processing tank. In other such embodiments, the evaporating processing tank further comprises a heater and an air agitator. In yet other embodiments, the evaporator assembly discharges the concentrated process solution when it is concentrated to greater than or equal to about 2 g/L Mn. In even further embodiments, the evaporator assembly discharges the concentrated process solution into a tank in an etchant process. The etchant process may comprise a source of manganese ions. In various embodiments, the process solution comprises an acid.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
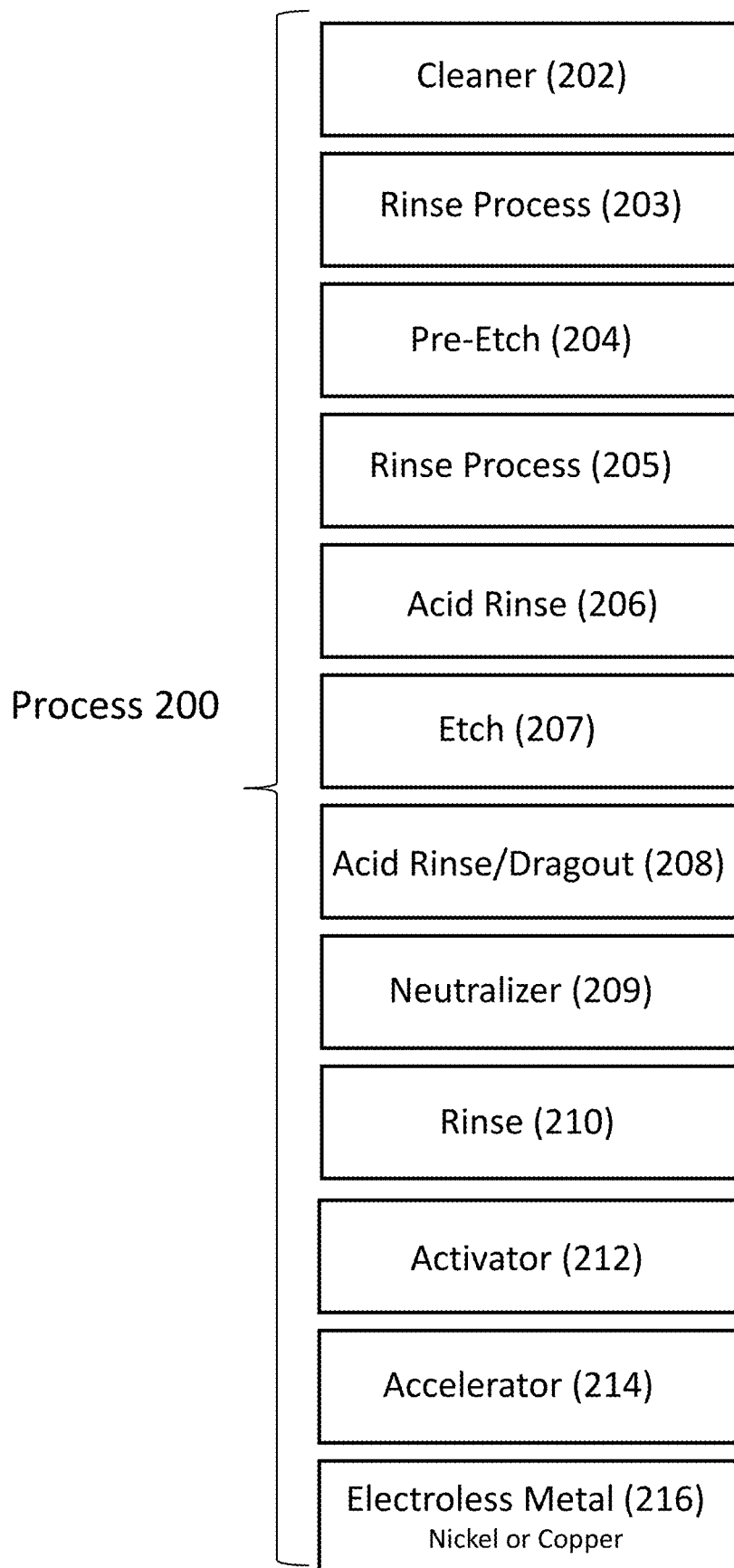
FIG. 1 shows a flowchart of a process for preparing an electrolessly metallized substrate.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. All numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters.

In addition, disclosure of ranges includes disclosure of all values and further divided ranges within the entire range, including endpoints and sub-ranges given for the ranges. As referred to herein, ranges are, unless specified otherwise, inclusive of endpoints and include disclosure of all distinct values and further divided ranges within the entire range. Thus, for example, a range of "from A to B" or "from about A to about B" is inclusive of A and of B.

Example embodiments will now be described more fully with reference to the accompanying drawings.

In various aspects, the present disclosure provides methods for improving manufacturing processes for etching and metallizing nonconductive substrates. More specifically, the present disclosure provides methods of reclaiming manganese etchant solution used to etch a nonconductive substrate. Manganese etchant solutions are useful to prepare nonconductive substrates for electroless metallization, and such substrates are particularly suitable for use in components of an automobile or other vehicle, and may additionally be used in a variety of other industries and applications, including aerospace components, farm equipment, industrial equipment, home decor and heavy machinery, by way of non-limiting example. Further, the present methods and materials are particularly suitable for forming lightweight, corrosion resistant components for a vehicle, including vehicle fascia, and interior and exterior decorative trim, by way of non-limiting example.

The present invention is directed to further streamlining processes for metallizing electrically nonconductive substrates and to reduce the manufacturing and operational costs associated therewith. Metallization of electrically nonconductive substrates generally comprises the following: (A) etching a substrate; (B) rendering the electrically non-conductive substrate electrically conductive; and (C) metallizing the substrate rendered electrically conductive.

Appropriate nonconductive substrates for use according to the disclosure herein include many different plastics and include many plastic resins including phenolic, urea formaldehyde, polyethersulfone, polyacetal, diallyl phthalate, polyetherimide, Teflon, polyarylether, polycarbone, polyphenylene oxide, mineral-reinforced nylone, and polysulfone. Particularly suitable plastics for use according to the disclosure herein is acrylonitrile-butadiene-styrene (ABS), and Polycarbonate acrylonitrile-butadiene-styrene (PC/ABS).

Referring to FIG. 1, a general description of the process for metallizing a nonconductive substrate 200 is shown. Optionally, the nonconductive substrate is cleaned by cleaner 202. The substrate is then rinsed in a series of one or more rinses 203. The nonconductive substrate is then optionally pre-etched by pre-etch 204. Pre-etching the nonconductive substrate swells the nonconductive substrate, making it more susceptible to etching. For any substrates immersed in the pre-etching solution a rinsing process of one or more rinses 205 is completed. Regardless of whether the optional cleaning and pre-etch steps occur, the nonconductive substrate is rinsed in an acid containing rinse 206 prior to being etched in etching bath 207. Etching bath 207 comprises a manganese containing etchant solution. Under conventional methods, the etched substrate may be conditioned with a conditioner to promote activation. Also optionally under conventional methods, the etched substrate may be rinsed in a solution 208 containing some or all of the acid components of the etching bath to remove any excess acid or other undesirable materials on the etched substrate. In many embodiments under the present disclosure, however, after etching, the etched substrate is not conditioned or rinsed. Rather, after the nonconductive substrate is etched, the etched substrate is neutralized in neutralizer 209. Neutralizing removes the etched substrate of any remaining etchant. If the etched substrate is rinsed, it may be reclaimed as a neutralizer by adding an oxidizer and agitating the rinsate. Optionally, the etched substrate is pre-activated prior to activation. Pre-activation operates to facilitate absorption of the activator. After neutralization, the etched substrate is activated by exposing the etched substrate to activator 210. Activator 210 is typically a metal colloid or ionic solution selected from the metals of transition group VIII of the Periodic Table of the Elements and more preferably is selected from the group consisting of palladium, platinum, iridium, rhodium, and mixtures thereof along with a tin salt. Most preferably, activator 212 is palladium. Activator 212 fills the pores created by etching, After activation, the etched substrate undergoes accelerating 214. Accelerating 214 removes excess materials from the metal colloid, thereby ensuring metallization of the etched substrate as a result of the mechanical connection of the metal of the metal colloid with the pores of the etched substrate. After acceleration, the parts are immersed in the electroless nickel or electroless copper 216 to complete the metallization of the substrate.

Figure 2:
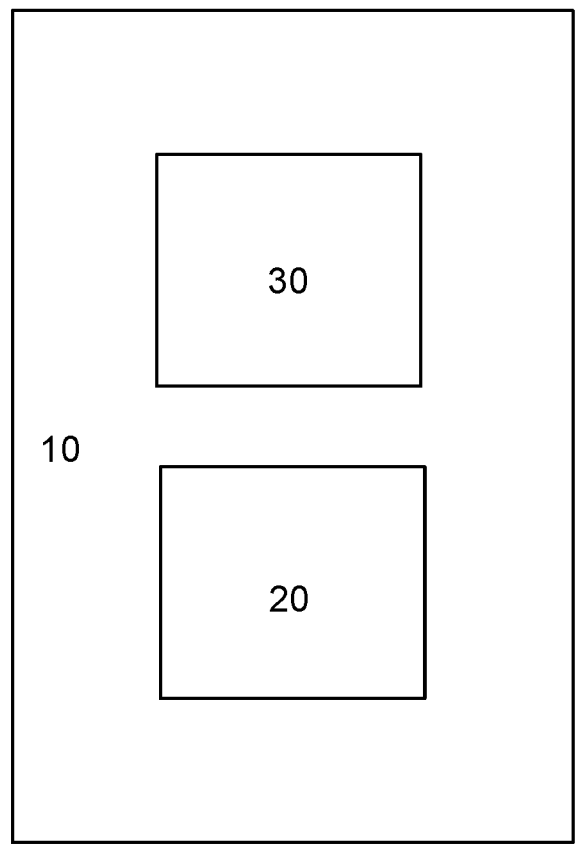
FIG. 2 shows a representative evaporating assembly according to the present disclosure.

According to the present disclosure, an exemplary evaporating system comprising an evaporator assembly is further provided for use in connection with the Acid Rinse 208 or neutralizer 209. More specifically, referring to FIG. 2, an exemplary evaporator assembly 10 is shown according to the disclosure herein. Evaporator assembly 10 is comprised of evaporator processing tank 20 and evaporator 30.

Figure 3:
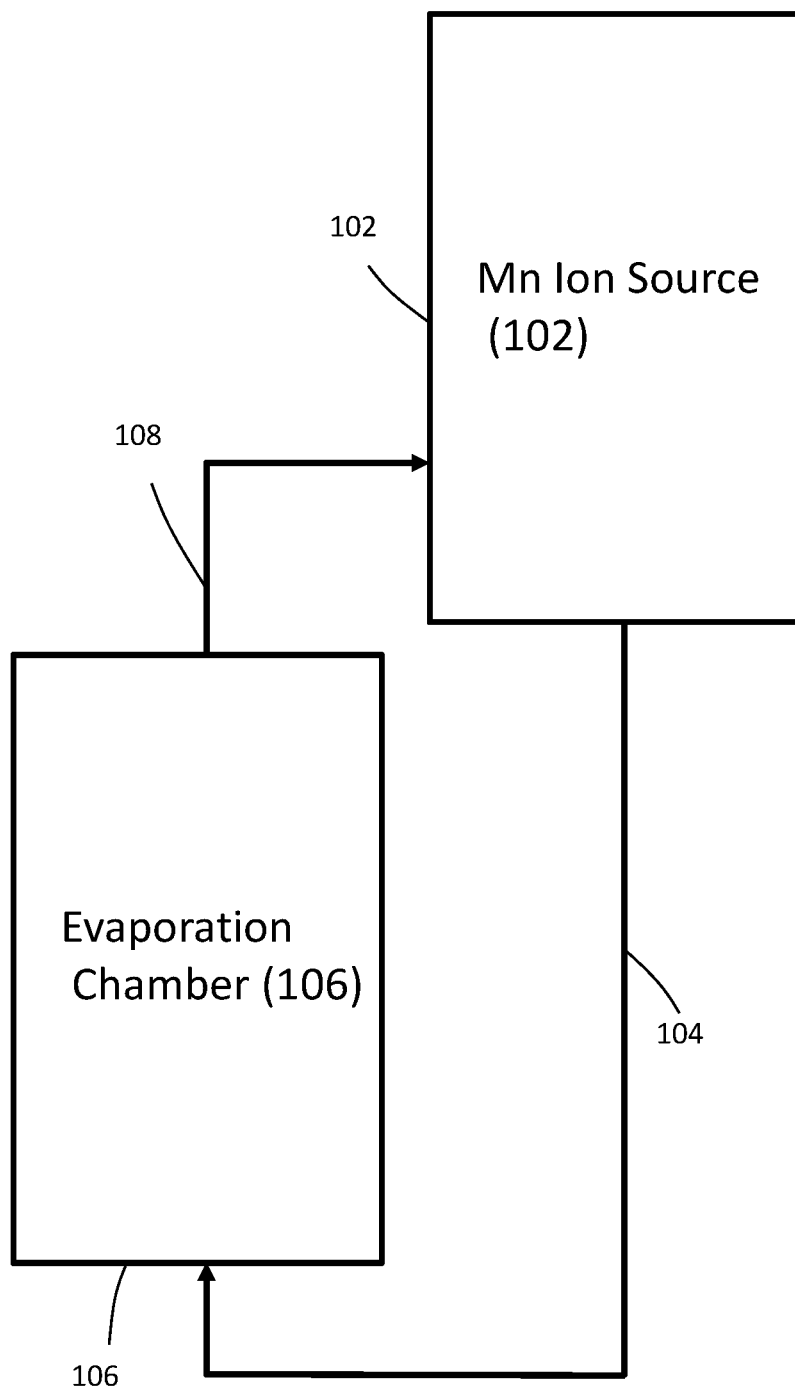
FIG. 3 Shows a flow diagram for an evaporator assembly on a general Manganese Ion Source

Referring to FIG. 3, an exemplary evaporating system is shown according to the disclosure herein. A portion of a source of Manganese ions 102 is syphoned off via a first conduit 104. First conduit 104 directs the portion of the bath to vacuum evaporator 106. The portion of the bath directed to vacuum evaporator 106 is evaporated in vacuum evaporator 106. Evaporating in vacuum evaporator results in distillate water and concentrated liquid. The concentrated liquid is directed through second conduit 108 and fed back into Manganese Ion source 102. The distillate water may be further collected, processed, and reused or discarded.

The source of manganese ions may be any one of a Manganese-based etchant bath, a rinsate accumulated during rinsing an etched substrate, and a solution accumulated during neutralizing an etched substrate that may have been rinsed. It is further envisioned that an evaporator may evaporate any of (1) at least a portion of a manganese-based etchant bath, (2) the acid collection bath following the etching phase, (3) the rinsate accumulated during rinsing an etched substrate, and (4) a solution accumulated during neutralizing an etched substrate before or after rinsing, or that there may be corresponding evaporators for each.

First conduit 104 may comprise any medium for transferring a liquid from one area to another and may include, as non-limiting examples, piping, tubing, channel, ductwork, or any other transferring assembly capable of transferring a liquid from one area to another. First conduit 104 may be formed of any material exhibiting suitable acid resistance. First conduit 104 may further comprise a filter for prohibiting particulates from entering vacuum evaporator 106. First conduit 104 may further comprise a pump for increasing the flow to the vacuum evaporator 106. First conduit 104 may further comprise a one-way valve for prohibiting at least a portion of the manganese-based etchant bath from returning to manganese Ion source 102 via first conduit 104.

Manganese-based etchant baths use strong acids; therefore, suitable vacuum evaporators for use according to the present invention are those that are capable of resisting acid corrosion and capable of concentrating strong acids, including the following acids used in manganese-based etchant baths: phosphoric acid, peroxomonophosphoric acid, peroxodisphosphoric acid, sulfuric acid, peroxomonosulfuric acid, and peroxodisulfuric acid, and methane sulfonic acid. While the starting concentrations are dependent on the rates at which substrates are rinsed and/or dragged out and/or the manganese-based etchant bath itself, suitable vacuum evaporators are comprised of materials that resist corrosive acid attack at high acid concentrations (e.g., acid concentrations approaching the limit of how well vacuum evaporators presently can evaporate water). Non-limiting examples of appropriate vacuum evaporators include single effect evaporators, including single effect climbing film evaporators; multiple effect evaporators, including triple effect evaporators; and rising thin film vacuum evaporators. The vacuum evaporators according to the present disclosure further include vacuum distillation units, including rotary evaporators and dry vacuum distillation columns. Preferably, the vacuum evaporator employs a heat source to further speed up the rate of evaporation. Suitable heat sources include heat exchangers including steam and oil heat exchangers. After evaporation, the concentrated acid may subsequently be purified.

In various embodiments, evaporator processing tank 20 is a container for holding process solution for evaporation and may further comprise a heater and/or an air agitator to facilitate evaporation of the process solution.

In various embodiments, evaporator 30 is a vacuum evaporator. Vacuum evaporators generally operate by reducing the pressure in a liquid-filled container below the vapor pressure of the liquid so that the liquid therefore evaporates.

In other various embodiments, evaporator 30 is an atmospheric evaporator. Atmospheric evaporators are generally known as units that spray a solution to be evaporated onto a panel for evaporating the solution. The sprayer is configured to spray the solution such that a maximum amount of surface area of the solution is exposed to air, thereby accelerating evaporation of the solution.

In a preferable embodiment, the process solution comprises an acid based rinse for an etching process. Rinsing of the etched substrate in a rinse comprising a dilute acid matrix of the same acids present in the etching process allows for cleaner parts while maintain oxidation state of any Mn(VII) removed from etching bath by the substrate.

In another preferable embodiment, the neutralizer comprises a mixture of an acid and an oxidizer. Etching the nonconductive substrate via a source of Mn(VII) ions results in reducing the Mn(VII) ions to manganese dioxide. Neutralizing the etched substrate via a mixture of an acid and an oxidizer accomplishes at least the following benefits. First, manganese dioxide can adhere to the etched substrate and interferes with the mechanical connection between the metal colloid and the etched substrate, which can result in non-uniform and poor electroless metallization and therefore ultimately poor metallization of the substrate. A mixture of an acid and an oxidizer, however, removes the manganese dioxide that had accumulated on the etched substrate, thereby ensuring adequate metallization. Second, manganese dioxide dissolves to water-soluble Mn(II) ions which can ultimately be reintroduced into a solution for generating Mn(VII) ions.

In any evaporator assembly configuration, the evaporator assembly may evaporate any oxidizer present in the process solution along with water. After evaporation is complete, the evaporated process solution comprises dissolved manganese ions and the acids present in the solution. Importantly, the manganese ions remain in solution after evaporation.

Ultimately, the evaporated process solution is added to an etching process tank. Before adding the evaporated process solution, rebalancing the evaporated process solution may be required to make the evaporated process solution comparable to the solution of the etching process tank. In some particularly preferred embodiments, the etching process tank is part of a manganese-based etchant solution bath. In other preferred embodiments the etching process tank is part of an acid-based rinse process It is therefore particularly preferable that the etching bath comprises an acidic bath comprising a source of Mn(VII) ions and a one or more acids.

In further embodiments, etching bath 207 may further comprise an Mn(VII) regeneration unit for oxidizing a manganese species of less than +7 to Mn(VII). In even further embodiments, the regeneration unit may be separate from etching bath 207 and regenerated Mn(VII) may be subsequently introduced into etching bath 207 after regeneration in the regeneration unit.

Figure 4:
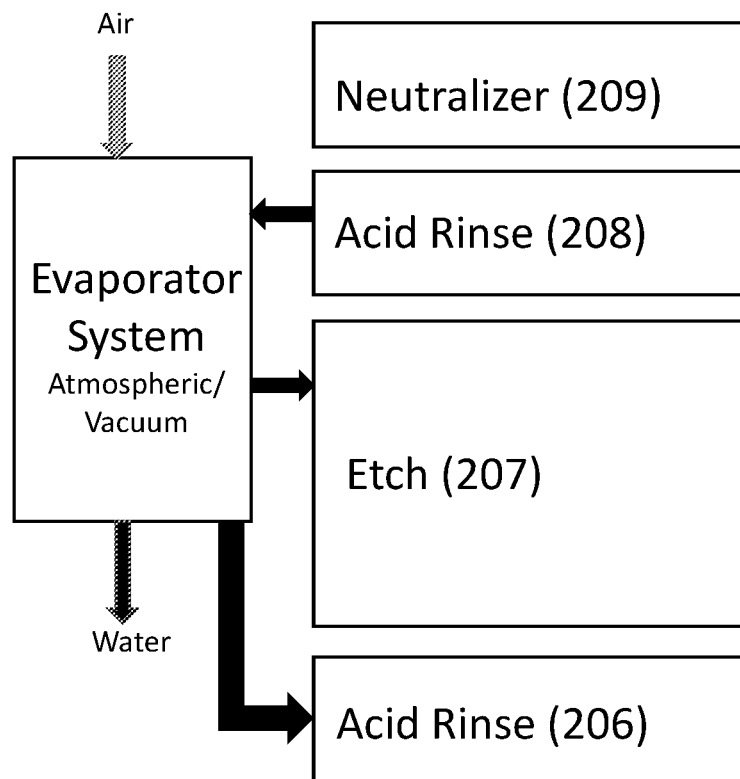
FIG. 4 shows a flowchart of a process for an evaporator collecting from an acid rinse to supply an etchant bath and/or acid rinse.
Figure 5:
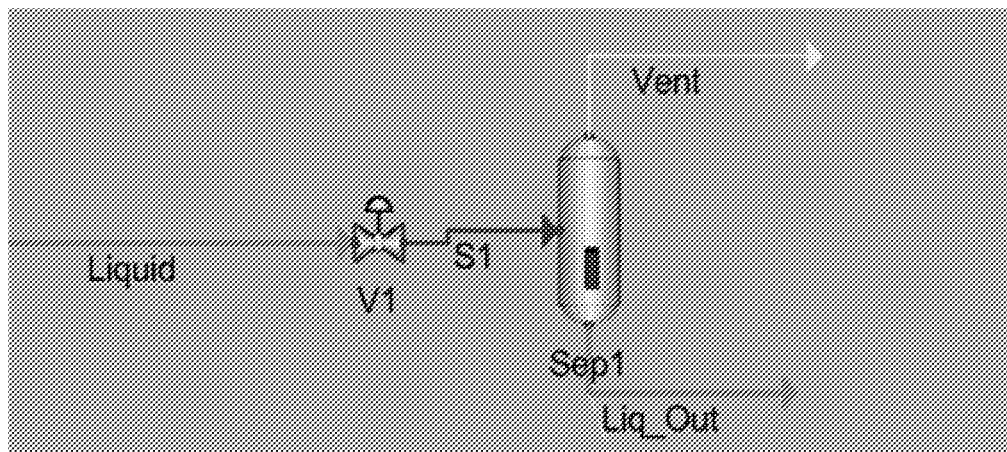
FIG. 5 shows the processing parameters for an example of manganese recovery employing an evaporating assembly using an acid rinse as a source of manganese ions

In view of the foregoing description of the method and possible alternative embodiments employed, an example of the manganese recovery rates achievable in association with the method is presented in FIGS. 4 and 5.

Referring to FIG. 3 which shows a process flow for an evaporator process where a first evaporator assembly is fluidly coupled to the Acid Rinse 208 as the input to the evaporation assembly with the option to output to Acid Rinse 206 or the Etch Bath 208. Referring to FIG. 4, the parameters illustrated for one example set of processing conditions which produce an acceptable result. FIG. 5 demonstrates as a graphical depiction the recovery rates obtained under the parameters over a range of operating conditions.

It was determined that for an etching bath having a composition of an acid matrix with specific gravity greater than or equal to 1.630 and Manganese Concentration of greater than or equal to 2 g/l, the acceptable rates for manganese recovery are shown in the various green shades with the brightest green shades being optional. The red shading depicts conditions under which the rates of recovery were found to be sub-optimal and unacceptable.

In a non-limiting example of a rinsate solution compromising a mixed acid matrix and a manganese ion source being run at a rate to maintain production and development requirements, the evaporator fluidly coupled to the manganese ion source is utilized at pressures at or below 1.8 psig to achieve the desired concentration levels. The desired concentration levels are a function of the processing line speed and the solutions fluid properties within the treatment tank. For one particular example, if an etch bath operating at a specific gravity 1.650, it has been found that operating a vacuum evaporator on an acid concentration rinse at a pressure at or below 0.8 psig with a temperature controlled to be at or above 140° F., serves to sufficiently concentrate the evaporate so that it can be reintroduced into the treatment tank.

Figure 6:
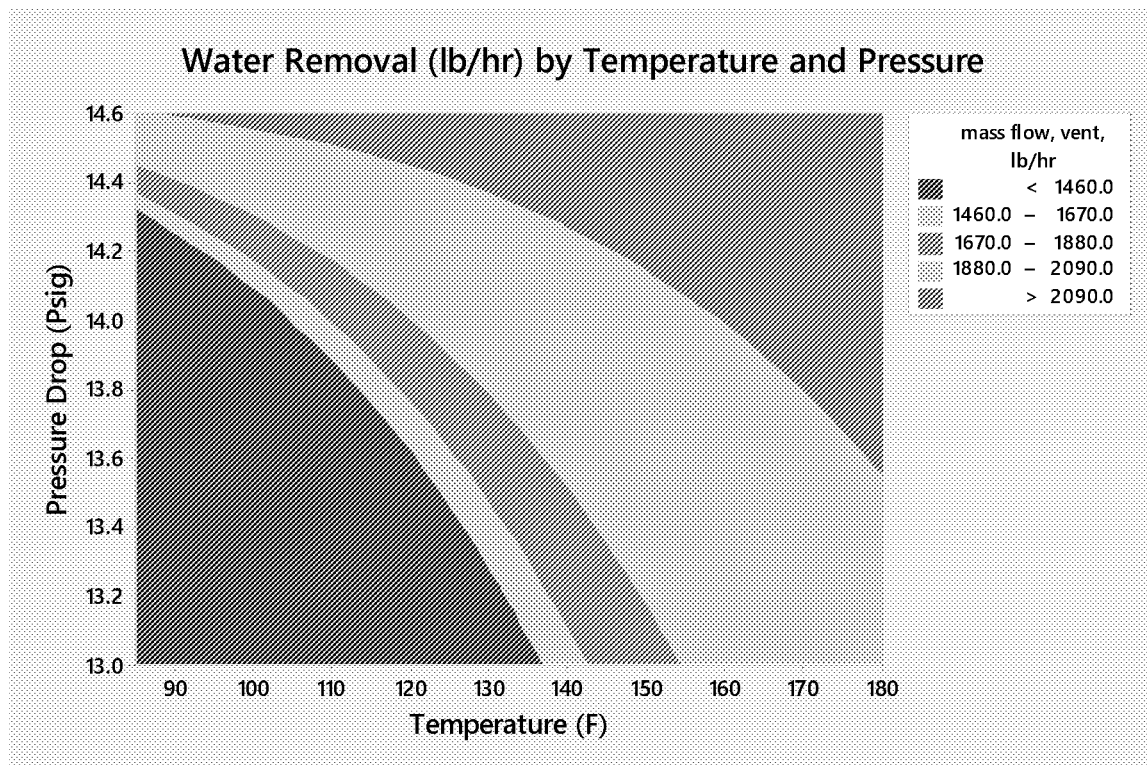
FIG. 6 is a graph depicting the results of the example of FIG. 4.
Figure 7:
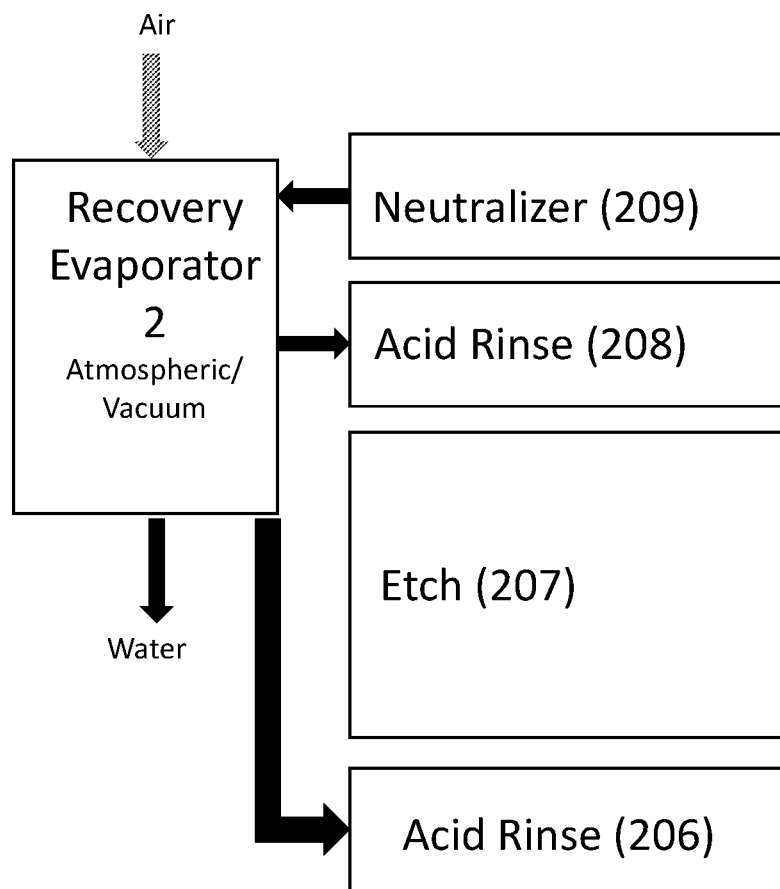
FIG. 7 shows a flowchart of a process for an evaporator collecting from a neutralizer process to supply an acid rinse
Figure 8:
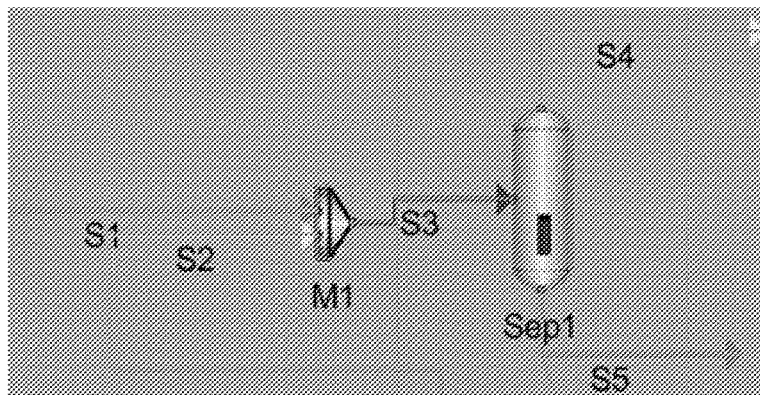
FIG. 8 shows the processing parameters for another example of manganese recovery employing an evaporating assembly.
Figure 9:
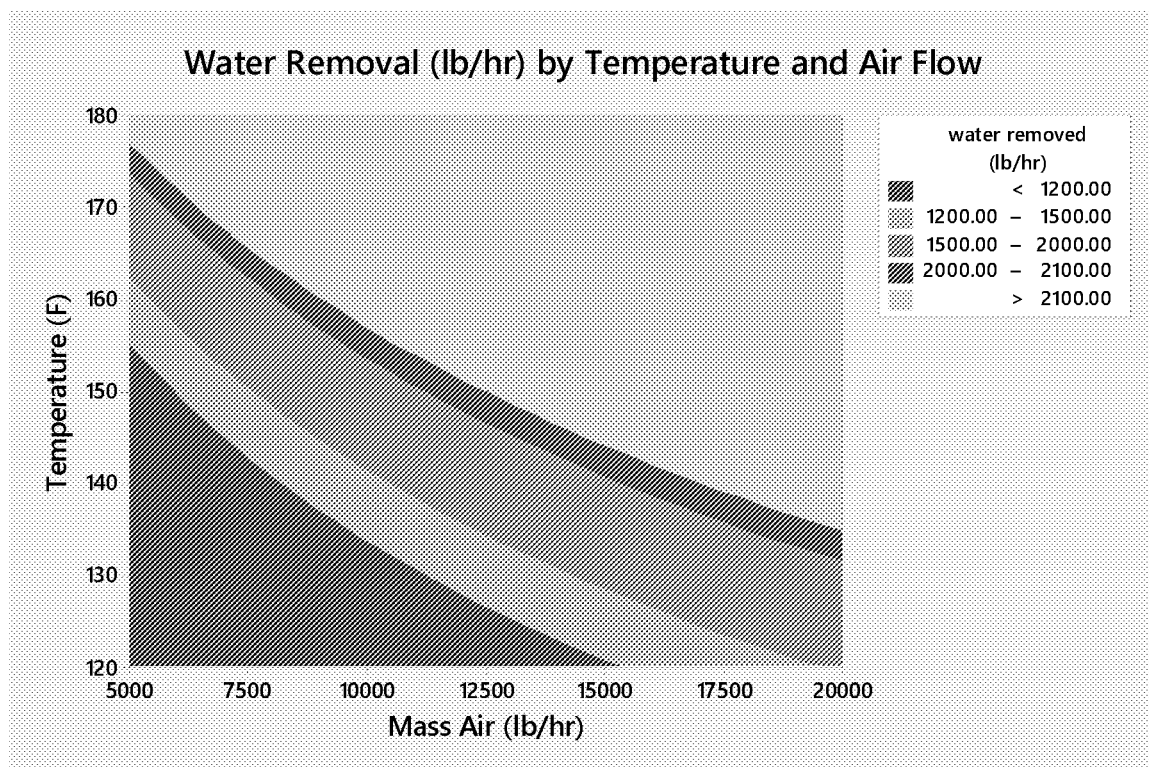
FIG. 9 is a graph depicting the results of the example of FIG. 7.

Similarly, FIG. 6 shows a process flow for an evaporator system fluidly coupled to Neutralizer 209 as the source of solution either and Acid Rinse 206 or Acid Rinse 208 as the output. FIG. 7 outlines the parameters for an example embodiment where according to FIG. 6. FIG. 7 demonstrates as a graphical depiction the recovery rates obtained under a range of parameters.

It was determined that for an Acid Rinse bath having a composition of approximately 20-70% Acid Matrix and approximately 2 g/l or more Manganese Ions, and the balance of water, the acceptable rates for manganese recovery are shown in the various green shades with the brightest green shades being optional. The red shading depicts conditions under which the rates of recovery were found to be sub-optimal and unacceptable.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for recovering manganese etchant solution, the method comprising:
   etching a nonconductive substrate with a manganese etchant solution;
   neutralizing with a neutralizer the nonconductive substrate after etching the substrate with the manganese etchant solution, wherein the neutralizer comprises a process solution comprising an acid and an oxidizer;
   removing from the neutralizer at least a portion of the process solution to an evaporator assembly;

evaporating the process solution in the evaporator assembly to remove water from the process solution to form a concentrated process solution; and
adding the concentrated process solution to the manganese etchant solution or an acid rinse.

2. The method according to claim 1, wherein the concentrated process solution is concentrated to greater than or equal to about 2 g/L Mn.

3. The method according to claim 1, wherein the evaporator assembly further comprises an atmospheric evaporator or vacuum evaporator.

4. The method according to claim 1, wherein the process solution comprises a source of manganese ions.

5. The method of claim 1, wherein manganese etchant solution comprises Mn(VII) ions.

6. The method of claim 1, wherein the nonconductive substrate comprises at least one of a plastic or a resin.

7. The method of claim 1, further comprising pre-etching the nonconductive substrate before etching the nonconductive substrate.

8. The method of claim 1, further comprising, after neutralizing the nonconductive substrate, exposing the nonconductive substrate to an activator that comprises palladium, platinum, iridium, rhodium, or mixtures thereof.

9. The method of claim 1, further comprising rinsing the nonconductive substrate in an acid based rinsate.

10. The method of claim 1, wherein the evaporator assembly further comprises an evaporating processing tank.

11. The method according to claim 10, wherein the evaporating processing tank is operated under temperature control and with controlled air treatment.

12. The method according to claim 11, wherein the controlled air treatment is at a flowrate from about 1880 lb/hr to about 2090 lb/hr.

13. The method according to claim 11, wherein the temperature is from about 155° F. to about 180° F.

14. The method according to claim 13, wherein the controlled air treatment is at a flowrate from about 1880 lb/hr to about 2090 lb/hr.

15. A method for recovering manganese etchant solution, the method comprising:
etching a nonconductive substrate with a manganese etchant solution;
rinsing the nonconductive substrate in an acid based rinsate;
neutralizing with a neutralizer the nonconductive substrate after etching the substrate with the manganese etchant solution, wherein the neutralizer comprises a process solution comprising an acid and an oxidizer, wherein the neutralizing results in a used process solution comprising manganese ions;
concentrating at least a portion of the used process solution to a manganese ion concentration similar to the manganese etchant solution; and
feeding the concentrated used process solution into the manganese etchant solution or an acid rinse.

16. The method according to claim 15, wherein the concentrated used process solution is concentrated to greater than or equal to about 2 g/L Mn.

17. The method according to claim 15, wherein the process solution comprises manganese ions.

18. The method according to claim 15, wherein the process solution comprises a source of manganese ions.

19. The method according to claim 15, wherein at least a portion of the used process solution is transferred into an evaporating processing tank for concentrating the process solution.

20. The method according to claim 19, wherein the evaporating processing tank is part of an evaporator assembly that further comprises an atmospheric evaporator or vacuum evaporator.

21. The method according to claim 19, wherein the evaporating processing tank is operated under temperature control at a constant temperature and with controlled air treatment.

22. The method according to claim 21, wherein the controlled air treatment is at a flowrate from about 1880 lb/hr to about 2090 lb/hr.

23. The method according to claim 21, wherein the constant temperature is from about 155° F. to about 180° F.

24. The method according to claim 23, wherein the controlled air treatment is at a flowrate from about 1880 lb/hr to about 2090 lb/hr.

\* \* \* \* \*